(12) United States Patent
Alakarhu

(10) Patent No.: US 10,136,046 B2
(45) Date of Patent: Nov. 20, 2018

(54) IMAGING AND SENSING DURING AN AUTO-FOCUS PROCEDURE

(75) Inventor: Juha Alakarhu, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/410,351

(22) PCT Filed: Jun. 27, 2012

(86) PCT No.: PCT/IB2012/053258
§ 371 (c)(1),
(2), (4) Date: Dec. 22, 2014

(87) PCT Pub. No.: WO2014/001844
PCT Pub. Date: Jan. 3, 2014

(65) Prior Publication Data
US 2015/0365585 A1    Dec. 17, 2015

(51) Int. Cl.
H04N 5/232 (2006.01)
H04N 5/345 (2011.01)
G02B 7/28 (2006.01)
H04N 5/235 (2006.01)
G03B 13/36 (2006.01)
G02B 7/36 (2006.01)

(52) U.S. Cl.
CPC ........... *H04N 5/23212* (2013.01); *G02B 7/28* (2013.01); *H04N 5/2353* (2013.01); *H04N 5/3454* (2013.01); *G02B 7/36* (2013.01); *G03B 13/36* (2013.01)

(58) Field of Classification Search
CPC ............. H04N 5/23212; H04N 5/2353; H04N 5/3454; G02B 7/28; G02B 7/36; G03B 13/36
See application file for complete search history.

(56) References Cited

U.S. PATENT DOCUMENTS

| 5,105,278 A | 4/1992 | Takemoto |
| 5,138,356 A | 8/1992 | Nakamura et al. |
| 5,235,375 A | 8/1993 | Yamana et al. |
| 5,422,700 A | 6/1995 | Suda et al. |
| 6,567,123 B1 | 5/2003 | Hashimoto |
| 2005/0099523 A1 | 5/2005 | Konishi et al. |

(Continued)

FOREIGN PATENT DOCUMENTS

| EP | 1 613 062 A1 | 1/2006 |
| WO | WO 03/102519 A1 | 12/2003 |
| WO | WO 2007/057498 A1 | 5/2007 |

OTHER PUBLICATIONS

International Search Report and Written Opinion from International Application No. PCT/IB2012/053258 dated Jun. 7, 2013.

(Continued)

*Primary Examiner* — Twyler Haskins
*Assistant Examiner* — Angel L Garces-Rivera
(74) *Attorney, Agent, or Firm* — Alston & Bird LLP

(57) ABSTRACT

A method comprising: selecting one of a plurality of read start positions for an image sensor; during a first auto-focus frame, moving a focused region of an optical system relative to an image sensor in accordance with an auto-focus control signal and then after moving the focused region of the optical system relative to the image sensor and during the first auto-focus frame, starting reading of the image sensor from the read start position. An apparatus that can perform the method.

18 Claims, 5 Drawing Sheets

(56) References Cited

U.S. PATENT DOCUMENTS

Figure 1:
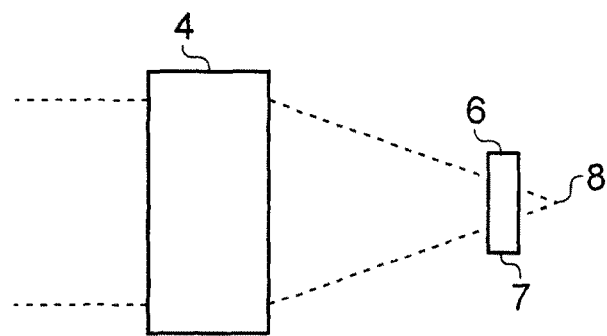

| | | |
|---|---|---|
| 2006/0198624 A1 | 9/2006 | Riichi et al. |
| 2007/0116450 A1 | 5/2007 | Kijima |
| 2007/0188630 A1 | 8/2007 | Suzuki |
| 2008/0002960 A1 | 1/2008 | Ito et al. |
| 2008/0055424 A1 | 3/2008 | Jerdev |
| 2009/0067829 A1 | 3/2009 | Li et al. |
| 2009/0073305 A1 | 3/2009 | Motohiro et al. |
| 2009/0135294 A1 | 5/2009 | Hirai et al. |
| 2011/0037890 A1 | 2/2011 | Nozaki |
| 2012/0051730 A1 | 3/2012 | Cote et al. |

OTHER PUBLICATIONS

Extended European Search Report from corresponding European Patent Application No. 12879762.8 dated Nov. 13, 2015.
Office Action from European Patent Application No. 12879762.8 dated May 31, 2017, 5 pages.

US 10,136,046 B2

IMAGING AND SENSING DURING AN AUTO-FOCUS PROCEDURE

TECHNOLOGICAL FIELD

Embodiments of the present invention relate to auto-focus. In particular, they relate to imaging and sensing during an auto-focus procedure.

BACKGROUND

Auto-focus involves automatically moving a focused region of an optical system relative to an image sensor so that when an image is captured by the image sensor it is in focus.

BRIEF SUMMARY

According to various, but not necessarily all, embodiments of the invention there is provided a method comprising: selecting one of a plurality of read start positions for an image sensor; during a first auto-focus frame, moving a focused region of an optical system relative to an image sensor in accordance with an auto-focus control signal and then after moving the focused region of the optical system relative to the image sensor and during the first auto-focus frame, starting reading of the image sensor from the read start position.

According to various, but not necessarily all, embodiments of the invention there is provided an apparatus comprising: at least one processor; and
at least one memory including computer program code the at least one memory and the computer program code configured to, with the at least one processor, cause the apparatus at least to perform: selecting one of a plurality of read start positions for an image sensor; during a first auto-focus frame, moving a focused region of an optical system relative to an image sensor in accordance with an auto-focus control signal and then after moving the focused region of the optical system relative to the image sensor and during the first auto-focus frame, starting reading of the image sensor from the read start position.

According to various, but not necessarily all, embodiments of the invention there is provided an apparatus comprising: a selector configured to select one of a plurality of read start positions for an image sensor; a focus controller configured to, during a first auto-focus frame, move a focused region of an optical system relative to an image sensor; a read controller configured to, during the first auto-focus frame and after relative movement between the focused region and the image sensor, control starting reading of the image sensor from the read start position.

BRIEF DESCRIPTION

Figure 2:
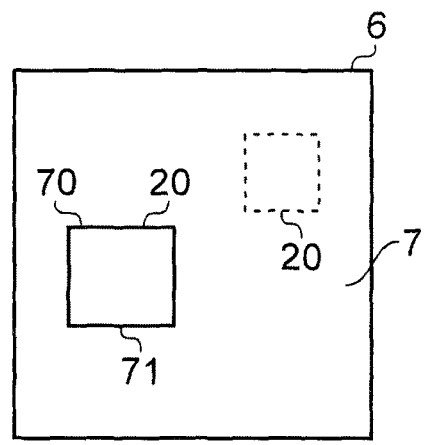
Figure 3:
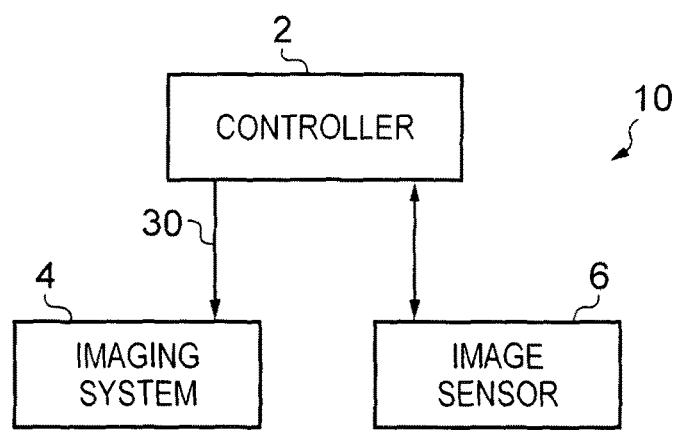
Figure 4A:
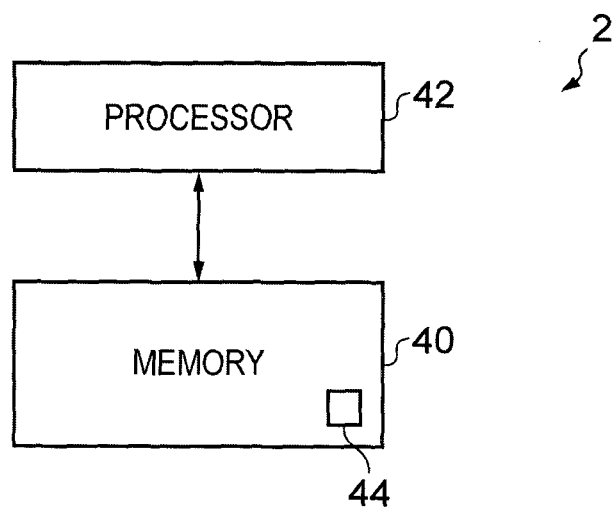
Figure 4B:
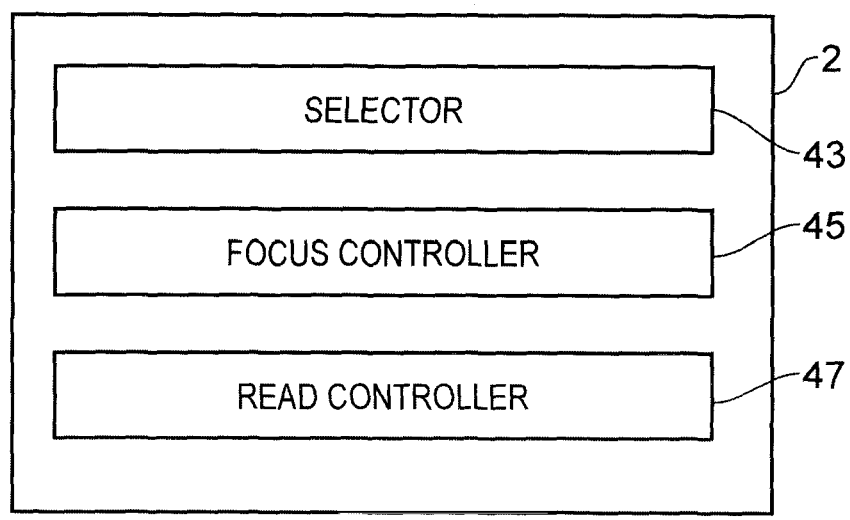
Figure 5:
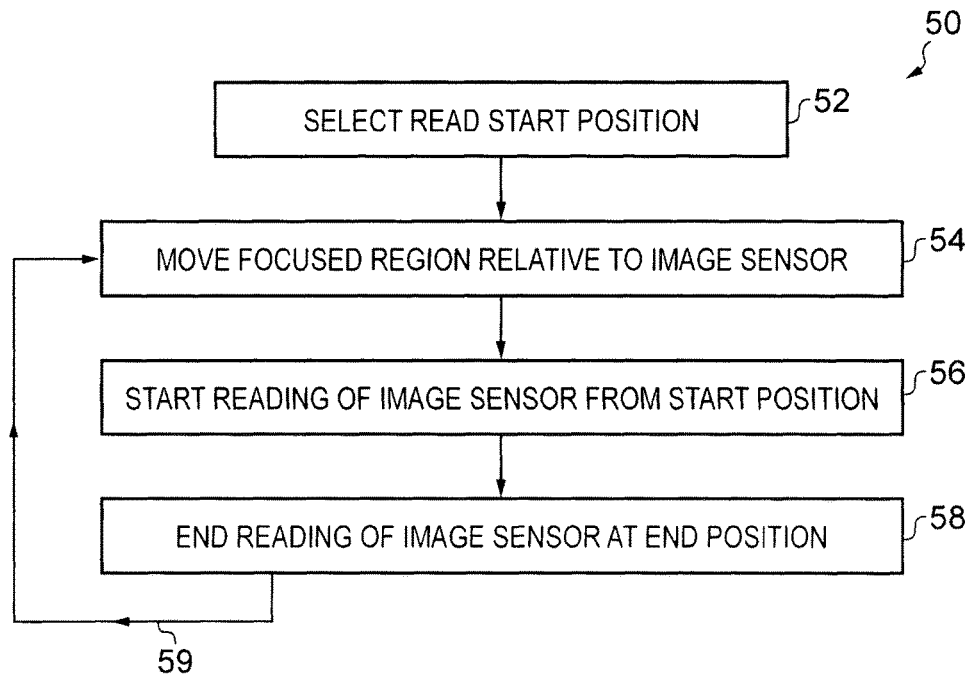
Figure 6:
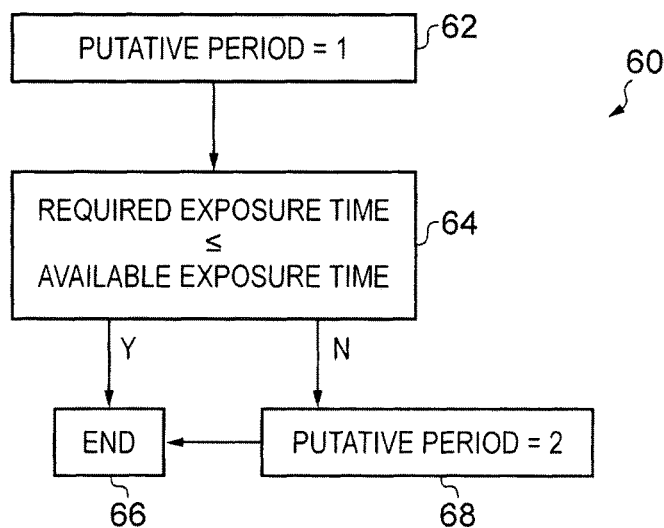
Figure 7:
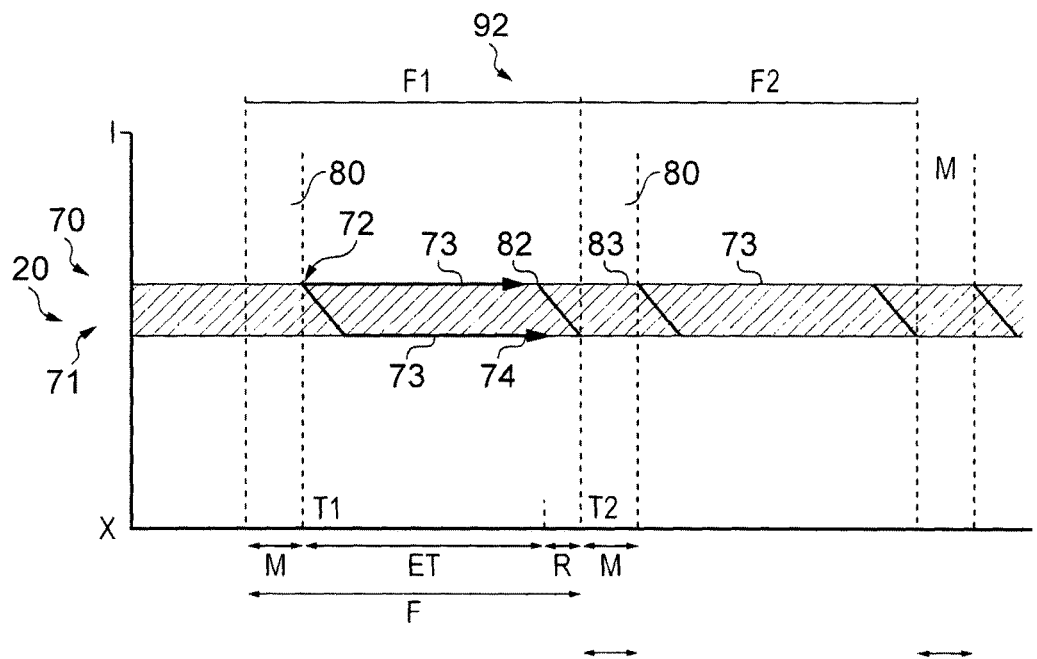
Figure 8:
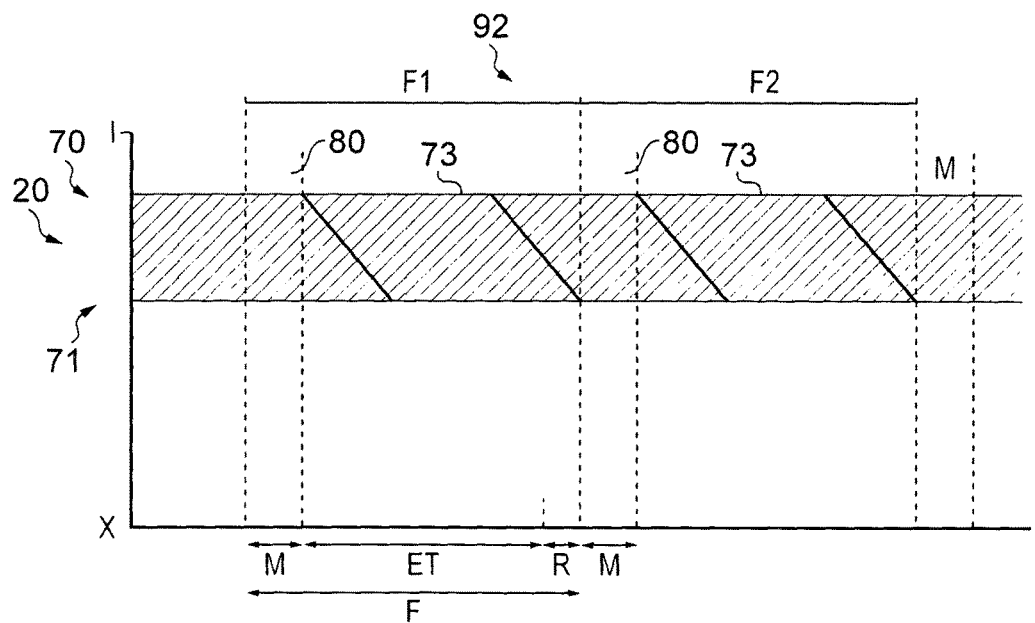
Figure 9:
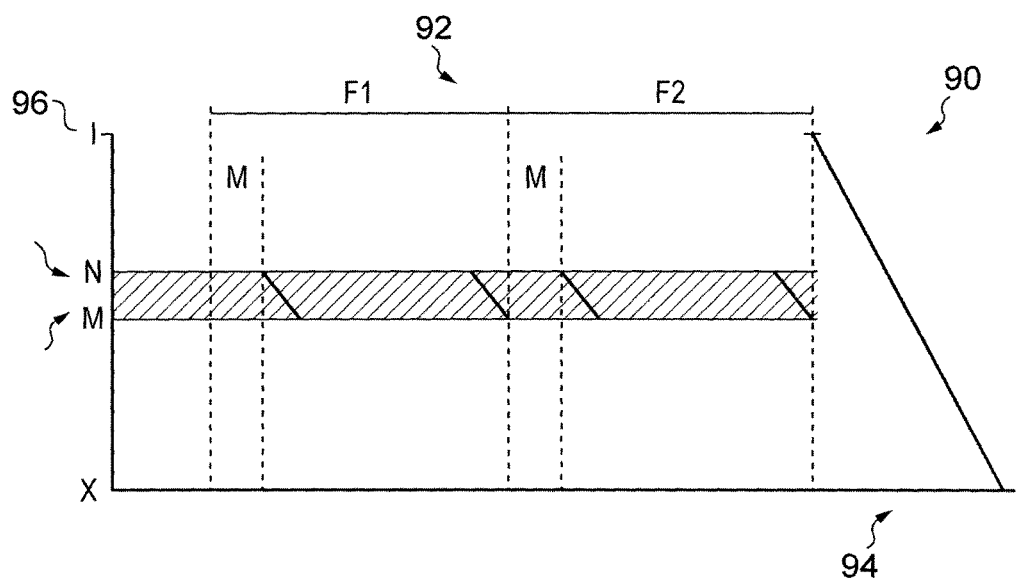

For a better understanding of various examples of embodiments of the present invention reference will now be made by way of example only to the accompanying drawings in which:

FIG. 1 illustrates, in cross-sectional view, moving a focused region of an optical system relative to an image sensor;
FIG. 2 illustrates, in plan view, an image sensor;
FIG. 3 illustrates an example of an apparatus;
FIG. 4A illustrates an example of a controller;
FIG. 4B schematically illustrates an example of the controller;

FIG. 5 illustrates an example of a method, that during a single auto-focus frame, both moves the focused region of the optical system relative to an image sensor and then starts reading of the image sensor from a selected read start position;
FIG. 6 illustrates an example of a control method that determine whether a movement process and a read process should be constrained to lie within the same frame period;
FIG. 7 illustrates an example of the method illustrated in FIG. 5;
FIG. 8 illustrates an example of the method illustrated in FIG. 5 similar to FIG. 7 but with a different selected read start position; and
FIG. 9 illustrates an image capture process that follows an auto-focus procedure;

DETAILED DESCRIPTION

The Figures illustrate a method 50 comprising: selecting 50 one of a plurality of read start positions 70 for an image sensor 6; during a first auto-focus frame F1, moving a focused region 8 of an optical system 4 relative to an image sensor 6 in accordance with an auto-focus control signal 30 and then after moving the focused region 8 of the optical system 4 relative to the image sensor 6 and during the first auto-focus frame F1, starting reading 72 of the image sensor 6 from the read start position 70.

The read start position for an image sensor 6 may be a position in time defining a start position of a sub-set of the auto-focus frame that is used for reading the image sensor 6. The read start position for an image sensor 6 may be a logical or physical position within the image sensor 6 defining a start position of a sub-set of the image sensor 6 that is read.

FIG. 1 illustrates, in cross-sectional view, moving a focused region 8 of an optical system 4 relative to an image sensor 6. The movement may, for example occur by moving the optical system 4 towards or away from the image sensor and/or by moving the image sensor 6 towards or away from the optical system 4 and/or by changing the optical power of the imagining system by, for example, changing its focal length.

The optical system 4 may comprise one or more lenses or other optical elements.

The image sensor 6 is a sensor that is capable of sensing visible light. It may comprise an array of sensor elements (sensels) each of which is capable of sensing an intensity over a sensor plane 7. The sensor elements may be color sensor elements, in which case they are capable of also sensing color, for example a single color sensor element may comprises a red sensor element that senses the intensity of red light, a green sensor element that senses the intensity of green light, and a blue sensor element that senses the intensity of blue light.

FIG. 2 illustrates, in plan view, an image sensor 6 and the sensor plane 7 of the image sensor 6. A sub-set 20 of the image sensor 6 corresponds to an area of the image which is used for focusing. It is desirable for this sub-set 20 to correspond to the focused region 8. As illustrated in FIG. 1, during an auto-focus procedure the focused region 8 of the optical system 4 is moved relative to an image sensor 6 such that it lies on the sensor plane 7 and covers the sub-set 20 of the image sensor 6.

The position of the sub-set 20 of the image sensor may be selectable. That is, the sub-set 20 may have different positions within the sensor plane 7 as illustrated in FIG. 2.

The size of the sub-set 20 of the image sensor may be selectable. That is, the sub-set 20 may have different areas within the sensor plane 7 as illustrated in FIG. 2.

In embodiments of the invention, reading of the image sensor 6 during an auto-focus procedure is limited to reading the sub-set 20 of the image sensor 6 instead of reading the whole of the image sensor 6. The start of the sub-set 20 defines a read start position 70 and the end of the sub-set 20 defines a read end position 71. As the position and/or size of the sub-set 20 varies the identity of the read start position 70 and the read end position 71 vary.

For an auto-focus procedure, the sub-set 20 may be determined and fixed (in size and position) for that auto-focus procedure. The read start position 70 and the read end position 71 would then also be fixed.

FIG. 5 illustrates an example of a method 50, that during a single auto-focus frame F1, both moves the focused region 8 of the optical system 4 relative to an image sensor 6 and then after moving the focused region 8 of the optical system 4 relative to the image sensor 6 and during the same auto-focus frame F1, starts reading 72 of the image sensor 6 from the read start position 70.

The method 50 starts at block 52 where one of a plurality of read start positions 70 is selected. The sub-set 20 of the image sensor 6 is defined in this block for the auto-focus procedure outside an iteration loop 59, it is therefore constant for each of the auto-focus frames F during the iteration of the auto-focus procedure described below.

At block 54, a focused region 8 of an optical system 4 moves relative to an image sensor 6 in accordance with an auto-focus control signal 30.

Next at block 56, after moving the focused region 8 of the optical system 4 relative to the image sensor 6, reading starts of the sub-set 20 of the image sensor 6 from the read start position 70.

Next at block 58, reading ends of the sub-set 20 of the image sensor 6 at the read end position 71.

The blocks 54, 56 and 58 all start and finish within the same auto-focus frame. An auto-focus frame is a time frame used in an iterative auto-focus procedure. It may for example, be 33 ms which corresponds to 30 frames per second.

The blocks 54, 56 and 58, in this iteration, all start and finish within the same auto-focus frame.

After block 58, the method repeats through iteration loop 59.

At block 54, the focused region 8 of an optical system 4 moves relative to an image sensor 6 in accordance with a new auto-focus control signal 30. The new auto-focus control signal 30 has been generated from the data read from the sub-set 20 of the image sensor 6 in the preceding auto-focus frame.

Next at block 56, after moving the focused region 8 of the optical system 4 relative to the image sensor 6, reading starts of the sub-set 20 of the image sensor 6 from the read start position 70.

Next at block 58, reading ends of the sub-set 20 of the image sensor 6 at the read end position.

The blocks 54, 56 and 58, in this iteration, all start and finish within the same auto-focus frame.

A common sub-set 20 of the image sensor 6 is used in each iteration of the auto-focus procedure. The selected read start position 70 and the selected read end position 71 are fixed for the each of the frames in the iterations.

After block 58, the method repeats until the auto-focus procedure ends. The method begins again at block 52 for a new auto-focus procedure.

The method 50 may also be understood with reference to a particular example illustrated in FIG. 7. FIG. 7 plots sensor elements of the image sensor 6 as a y-axis and time as an x-axis.

The sub-set 20 extends between the read start position 70 and the read end position 71 as illustrated on the y-axis of FIG. 7.

As illustrated in the particular example of FIG. 7, a movement process 80 occurs at the start of an auto-focus frame. For the first auto-focus frame F1, it occurs between the start of the auto-focus frame F1 and the time T1. In the example of FIG. 7, each auto-focus frame has a duration F.

The movement process 80 involves moving the focused region 8 of the optical system 4 relative to the image sensor 6. The movement process 80 occurs in every frame. The movement process 80 precedes a read process 73 in the same frame and follows the read process 73 in the preceding frame (if any). The read processes 73 and the movement processes do not overlap. In the example of FIG. 7, the move process has a duration M which may be constant or variable.

The read process 73 involves reading the whole of the selected sub-set 20 of the image sensor 6. A start of the read process 73 has a fixed relationship (e.g. immediately follows with no delay in the illustrated example) to termination of the preceding movement process 80.

The read process 73 starts 72 with starting reading the read start position 70 and continues until the selected read end position 71 is reached and read.

The read process 73 finishes 74 with finishing reading the read end position 71 which is at or before a time T2 when the next movement process 80 begins. The read process 73 occurs during the first auto-focus frame F1 and is repeated every frame F.

The time duration F−M between the end of the movement process 80 in a frame (e.g. T1) and the start of the movement process 80 in the next frame (e.g. T2) defines a maximum available time for the read process 73 and consequently a maximum available exposure time ET. The read process 73 lies within the time duration F−M.

The method 50 may also be understood with reference to a particular example illustrated in FIG. 8. The example of FIG. 8 is similar to FIG. 7 except that the sub-set 20 of the image sensor 6 has a different position and a different size. The read start position 70 is different and the separation between the read start position 70 and the read end position 71 is different.

This Fig illustrates that during different auto-focus procedures 92 (compare FIGS. 7 and 8), the sub-set 20 of the image sensor 6 may have a different position and/or a different size.

FIG. 8 illustrates that during successive auto-focus frames of the same auto-focus procedure 92, the sub-set 20 of the image sensor 6 remains fixed.

The position of the sub-set 20 of the image sensor is therefore selectable for an auto-focus procedure 92 but is then fixed for the auto-focus frames of that procedure.

The size of the sub-set 20 of the image sensor is therefore selectable for an auto-focus procedure 92 but is then fixed for the auto-focus frames of that procedure.

Referring to FIGS. 7 and 8, a reset process 83 involves resetting each sensel of the selected sub-set 20 of the image sensor 6. A start of the reset process 83 for a particular sensel has a fixed relationship (e.g. immediately follows with no delay in the illustrated example) to termination of the preceding read process 73 for that sensel (as opposed to sub-set 20).

The reset process 83 starts 82 with starting resetting the sensor 6 at the read start position 70 and continues until the selected read end position 71 is reached and reset. The reset process 83 finishes 84 with finishing resetting the read end position. The reset process 83 for the whole sub-set 20 starts in one auto-focus frame, continues during the movement process 80 of the next auto-focus frame and finishes during the read process 73 of the next auto-focus frame.

The reset process 83 for the read start position 70 starts in one auto-focus frame F1, continues during the movement process 80 of the next auto-focus frame F2 but finishes before the read process 73 of the next auto-focus frame F2.

The reset process 83 for the read end position 71 starts at the end of one auto-focus frame F1, continues during the movement process 80 of the next auto-focus frame F2 and finishes during the read process 73 of the next auto-focus frame F2.

If the duration in time of the reset process 83 for a single sensel is constant and the reset of the sensels can only occur at a fixed rate then the duration in time R of the reset process 83 for all of the sensels of the sub-set 20 is dependent upon the size of the sub-set.

During an auto-focus frame each sensel of the sub-set 20 must be read 73 and reset. The percent (%) of an auto-focus frame that must be devoted to the reset process of the sub-set 20 increases with the size of the sub-set and the % of the auto-focus frame that defines the maximum available exposure consequently decreases. The maximum available exposure time (maximum available read time for a sensel) ET is equal to the frame duration F minus the duration M of the movement process 80 minus the reset time R for the whole sub-set i.e. ET=F−M−R.

A reset process 83 at the image sensor 6 may start at the selected read start position 70 before a subsequent movement process 80 begins. A reset process 83 at the image sensor may end at the selected read start position 70 when a subsequent movement process 80 ends A reset process at the image sensor 6 may start at a selected read end position 71 when a subsequent movement process 80 starts A reset process at the image sensor 6 may end at a selected read end position 71 after a subsequent movement process 80 ends.

FIG. 6 illustrates an example of a control method 60. The purpose of this method 60 is to determine whether the movement process 80 and the read process 73 should be constrained to lie within the same frame period F, as in FIGS. 7 and 8 or whether the movement process 80 and the read process 73 should not be constrained to lie within the same frame period F, with at least part of the read process 73 occupying a subsequent frame F to the movement process 80.

If the read process 73 is constrained to lie within the same frame period F as the movement process 80 of duration M, then a time of F−M must be equal to or larger than the maximum available exposure time ET added to the total reset time R for the sub-set 20. As explained above, the total rest time R for the sub-set 20 may vary with the size of the sub-set 20 and therefore the total available exposure time ET may also vary.

If the total available exposure time ET is not more than or equal to the required exposure time then the auto-focus procedure 92 may not work properly.

According to the method 60, while the required exposure time does not exceed the available exposure time ET, then the movement process 80 and the subsequent read process 73 are constrained to lie within the same frame period F, as in FIGS. 7 and 8.

However, when the required exposure time exceeds the available exposure time, then the movement process 80 and the subsequent read process 73 are not constrained to lie within the same frame period F, and at least part of the read process 73 can occupy a subsequent frame F to the movement process 80. This can significantly increase the available exposure time. In one embodiment, the subsequent read process 73 can start immediately after the movement process 80 but extend into and until the end of the next frame. In another embodiment, the subsequent read process 73 starts at the beginning of the next frame.

Referring to FIG. 6, in this example of the method 60, the method 60 starts at block 62 by setting a putative period that constrains both the movement process 80 and the read process 73 as explained above. The default value is one auto-focus frame.

Next at block 64, it is tested whether the putative period is usable. The available exposure time ET is determined based on the putative period F, ET=F−M−R.

If the required exposure time, which may be dependent upon camera aperture and ambient lighting for example, is less than or equal the available exposure time then the method 60 can move to block 66 where it ends. The putative period then becomes a fixed period for a subsequent auto-focus procedure 92.

If the required exposure time, which may be dependent upon camera aperture and ambient lighting, for example, is more than the available exposure time then the method 60 moves to block 68 where the putative period is increased, in this example to two auto-focus periods. The method then moves to block 66 where it ends. The putative period then becomes a fixed period for a subsequent auto-focus procedure 92.

The method 60 may be performed for each auto-focus procedure 92.

FIG. 9 illustrates an image capture process 90 that follows an auto-focus procedure 92.

The auto-focus procedure 92 is similar to that described with reference to FIG. 7 and will not be further described here.

The image capture process 90 starts at the beginning of the frame 94 following the auto-focus procedure 92. The image sensor 6 is read during the frame 94 without moving the focused region 8 of the optical system relative to the image sensor 6. The image sensor 6 is read over an area different to and greater than the sub-set 20. It may, for example be read over a maximum available area from a initial position 96 to a final position 98.

FIG. 3 illustrates an example of an apparatus 10 comprising: a controller 2 configured to control the imaging system 4 and to communicate with the image sensor 6.

The components are operationally coupled and any number or combination of intervening elements can exist (including no intervening elements)

The controller 2 is configured to control the auto-focus procedure including some or all of the methods previously described including, for example, the method 50 illustrated in FIG. 5 and the method 60 illustrated in FIG. 6.

Implementation of the controller 2 can be in hardware alone (a circuit, a processor . . . ), have certain aspects in software including firmware alone or can be a combination of hardware and software (including firmware).

The controller 2 may be implemented using instructions that enable hardware functionality, for example, by using executable computer program instructions in a general-purpose or special-purpose processor that may be stored on a computer readable storage medium (disk, memory etc) to be executed by such a processor.

In FIG. 4A, the controller 2 comprises a processor 42 configured to read from and write to a memory 40. The processor 42 may also comprise an output interface via which data and/or commands are output by the processor and an input interface via which data and/or commands are input to the processor 42.

The memory 40 stores a computer program 44 comprising computer program instructions that control the operation of the controller 2 and, possibly the apparatus 10 when loaded into the processor 42.

The computer program instructions 44 provide the logic and routines that enables the apparatus to perform the methods illustrated in FIGS. 5, 6, 7, 8 and 9. The processor 42 by reading the memory 40 is able to load and execute the computer program 44.

The apparatus 10 therefore comprises: at least one processor 42; and
at least one memory 40 including computer program code 44 the at least one memory 40 and the computer program code 44 configured to, with the at least one processor 42, cause the apparatus 10 at least to perform: the method 50 comprising: selecting 50 one of a plurality of read start positions 70 for an image sensor 6; during a first auto-focus frame F1, moving a focused region 8 of an optical system 4 relative to an image sensor 6 in accordance with an auto-focus control signal 30 and then after moving the focused region 8 of the optical system 4 relative to the image sensor 6 and during the first auto-focus frame F1, starting reading 72 of the image sensor 6 from the read start position 70.

The computer program may arrive at the apparatus 10 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 44. The delivery mechanism may be a signal configured to reliably transfer the computer program 44. The apparatus 10 may propagate or transmit the computer program 44 as a computer data signal.

Although the memory 40 is illustrated as a single component it may be implemented as one or more separate components some or all of which may be integrated/removable and/or may provide permanent/semi-permanent/dynamic/cached storage.

FIG. 4B schematically illustrates an example of the apparatus 2. The apparatus 2 comprises a number of logical blocks including a selector 43, a focus controller 45 and a read controller 47 each of which performs a separate function.

The blocks 43, 45, 47 may be implanted in hardware as discrete circuits or may be implemented in hardware within a single circuit.

The blocks 43, 45, 47 may be implanted in firmware or software as discrete routines or programs or may be implemented within a single program.

The selector 44 is configured to select one of a plurality of read start positions for an image sensor.

The focus controller 45 is configured to, during a first auto-focus frame, move a focused region 8 of an optical system 4 relative to an image sensor 6.

The read controller 47 is configured to, during the first auto-focus frame and after relative movement between the focused region 8 and the image sensor 6, control starting reading of the image sensor 6 from the read start position 70.

The selector 44 may, for example, be configured to additionally define a read end position for the image sensor or otherwise define a sub-set 20 of the image sensor 6 that is read during the first auto-focus frame.

The focus controller 45 may be configured to move the focused region 8 of the optical system 4 relative to an image sensor 6 once every frame of an auto-focus procedure.

The read controller 47 may be configured to control reading of the image sensor 6 from the read start position 70 to the read end position 71 in very frame of an auto-focus procedure.

The read controller may be configured to, during the first auto-focus frame and after each relative movement between the focused region 8 and the image sensor 4, control starting reading of the image sensor from the read start position 70 once every period. The apparatus 2 may be configured to use one frame or two frames as the period. The time between subsequent movements of the focused region of the optical system relative to an image sensor is controlled to be more than a required exposure time.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

In the preceding paragraphs reference has been made to frames with a frame duration F. The frame duration F may correspond to 33 ms (e.g. 30 frames per second). The movement process 80 may take less than 20% of the frame duration in some embodiments. The movement process 80 may take less than 5 ms.

The read process 73 may vary in duration e.g. with shutter speed however there is flexibility for the read process 73 to be of a long duration, (e.g. as much as 30 ms) and support a slow shutter speed/long exposure and yet occur in every frame of an auto-focus procedure. The shutter speeds supported at 30 frames per second may, for example, $\frac{1}{1000}$ s, $\frac{1}{500}$ s, $\frac{1}{250}$ s, $\frac{1}{125}$ s and $\frac{1}{60}$ s.

The optical system 4 may use high speed actuators to adjust the position of the focused region 8. Examples of high speed actuators include for example piezo-polymer based solution from Polight.

The apparatus 10 may be part of an imaging device such as, for example, a camera or a mobile cellular telephone or some other personal hand-portable device.

The apparatus 10 may be a module. The controller 2 may be a module. As used here 'module' refers to a unit or apparatus that excludes certain parts/components that would be added by an end manufacturer or a user.

The blocks illustrated in the FIGS. 5 and 6 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
   selecting one of a plurality of read start positions for an image sensor;
   during a first auto-focus frame, moving a focused region of an optical system relative to an image sensor in accordance with an auto-focus control signal and then for a first time and during the first auto-focus frame, starting reading of the image sensor from the read start position; and
   during a second auto-focus frame, immediately subsequent to the first auto-focus frame, moving the focused region of the optical system relative to the image sensor in accordance with a new auto-focus control signal and then for a second time, starting reading of the image sensor from the read start position, wherein the new auto-focus control signal is variable, has been generated from the first data read from the image sensor in the preceding first auto-focus frame and specifies variations in the second time.

2. A method as claimed in claim 1, wherein reading of the image sensor during the first auto-focus frame continues until a selected read end position for the image sensor.

3. A method as claimed in claim 1, wherein a sub-set of the image sensor is read during the first auto-focus frame wherein a position and/or size of the sub-set of the image sensor is selectable.

4. A method as claimed in claim 1, wherein if the required exposure time is less than the available exposure time when the selected period is one frame, using one frame as the selected period and if the required exposure time is greater than the available exposure time when the selected period is one frame using two frames as the selected period.

5. A method as claimed in claim 1, wherein reading of the image sensor during the second auto-focus frame continues until a selected read end position.

6. A method as claimed in claim 1, wherein the selected read end position is fixed for the first frame and the second frame.

7. A method as claimed in claim 1, wherein a common sub-set of the image sensor is read during the first and second auto-focus frames.

8. A method as claimed in claim 7, wherein a position of the common sub-set of the image sensor is selectable and fixed for the first and second auto-focus frames.

9. A method as claimed in claim 7, wherein a size of the sub-set of the image sensor is selectable and fixed for the first and second auto-focus frames.

10. A method as claimed in claim 1, wherein reading of the image sensor during a third image capture frame, subsequent to the second frame, without moving the focused region of the optical system relative to the image sensor, reading the image sensor from a predetermined start position to capture an image.

11. A method as claimed in claim 10, wherein reading of the image sensor during the third capture frame continues until a predetermined end position.

12. A method as claimed in claim 1, wherein the process of starting reading of the image sensor from the read start position has a fixed time relationship to a preceding termination of moving the focused region of the optical system relative to the image sensor.

13. A method as claimed in claim 12, wherein the process of starting reading of the image sensor from the read start position immediately follows termination of moving the focused region of the optical system relative to the image sensor.

14. An apparatus comprising:
    at least one processor; and
    at least one memory including computer program code,
    the at least one memory and the computer program code configured to, with the at least one processor, cause the apparatus at least to perform:
    selecting one of a plurality of read start positions for an image sensor;
    during a first auto-focus frame, moving a focused region of an optical system relative to an image sensor in accordance with an auto-focus control signal and then for a first time and during the first auto-focus frame, starting reading of the image sensor from the read start position; and
    during a second auto-focus frame, immediately subsequent to the first auto-focus frame, moving the focused region of the optical system relative to the image sensor in accordance with a new auto-focus control signal and then for a second time, starting reading of the image sensor from the read start position, wherein the new auto-focus control signal is variable, has been generated from the first data read from the image sensor in the preceding first auto-focus frame and specifies variations in the second time.

15. An apparatus as claimed in claim 14, wherein a selector is configured to select one of a plurality of read start positions for the image sensor, and wherein the selector is configured to define a read end position for the image sensor; and the read controller is configured to control reading of the image sensor from the read start position to the read end position.

16. An apparatus as claimed in claim 14, wherein a focus controller is configured to, during a first auto-focus frame, move the focused region of the optical system relative to the image sensor, and wherein the focus controller is configured to move the focused region of an optical system relative to an image sensor once every period;

wherein a read controller is configured to, during the first auto-focus frame and after relative movement between the focused region and the image sensor, control starting reading of the image sensor from the read start position, the read controller configured to, during the first auto-focus frame and after relative movement between the focused region and the image sensor, control starting reading of the image sensor from the read start position once every period and wherein the apparatus is configured to use one frame or two frames as the period, wherein the time between subsequent movements of the focused region of the optical system relative to an image sensor is controlled to be more than a required exposure time, wherein the focus controller is configured to, during a second auto-focus frame, move the focused region of the optical system relative to an image sensor; and the read controller is configured to, during the second auto-focus frame and after relative movement between the focused region and the image sensor, control starting reading of the image sensor from the read start position.

17. An apparatus as claimed in claim 16, wherein the focus controller is configured to, during every frame, move the focused region of the optical system relative to an image sensor; and the read controller is configured to, during every frame and after relative movement between the focused region and the image sensor, control starting reading of the image sensor from the read start position.

18. A method comprising:
selecting one of a plurality of read start positions for an image sensor;
during a first auto-focus frame, moving a focused region of an optical system relative to an image sensor in accordance with an auto-focus control signal and then after moving the focused region of the optical system relative to the image sensor and during the first auto-focus frame, starting reading of the image sensor from the read start position,
wherein an end of a process of reading of the image sensor starting from the read start position is scheduled to occur at a first time and then with a selected period,
wherein a start of a subsequent process of moving the focused region of the optical system relative to the image sensor is scheduled to occur at a second time and then with the selected period,
and wherein the duration between the first time and the second time defines a maximum available exposure time and the method comprises:
selecting the selected period so that the required exposure time is less than the available exposure time.

* * * * *